(12) United States Patent
Adams et al.

(10) Patent No.: US 7,890,218 B2
(45) Date of Patent: Feb. 15, 2011

(54) CENTRALIZED MULTI-ZONE COOLING FOR INCREASED BATTERY EFFICIENCY

(75) Inventors: Daniel Thomas Adams, Palo Alto, CA (US); David Frederick Lyons, Palo Alto, CA (US); Philip Wayne Luk, San Jose, CA (US); Eugene Michael Berdichevsky, Palo Alto, CA (US); Jeffrey Brian Straubel, Menlo Park, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 721 days.

(21) Appl. No.: 11/779,843

(22) Filed: Jul. 18, 2007

(65) Prior Publication Data

US 2009/0024256 A1 Jan. 22, 2009

(51) Int. Cl.
*G05D 23/00* (2006.01)
(52) U.S. Cl. .................... 700/300; 700/278; 320/136
(58) Field of Classification Search ............... 700/300; 429/120; 62/87, 199, 259.2; 165/42, 43, 165/202, 287; 320/136, 150; 180/68.1, 68.5; 237/12.3 A, 12.3 B, 12.3 C, 12.3 R; 701/22
See application file for complete search history.

(56) References Cited

U.S. PATENT DOCUMENTS

| | | | | |
|---|---|---|---|---|
| 5,305,613 A * | 4/1994 | Hotta et al. | ................... | 62/209 |
| 5,391,193 A * | 2/1995 | Thompson | ................... | 607/29 |
| 5,483,807 A * | 1/1996 | Abersfelder et al. | .......... | 62/435 |
| 5,595,064 A * | 1/1997 | Ikeda et al. | ................... | 62/126 |
| 5,937,664 A * | 8/1999 | Matsuno et al. | ............ | 62/259.2 |
| 6,059,016 A * | 5/2000 | Rafalovich et al. | ............ | 165/41 |
| 6,138,466 A | 10/2000 | Lake et al. | | |
| 6,213,233 B1 * | 4/2001 | Sonntag et al. | ........ | 180/65.245 |
| 6,225,788 B1 * | 5/2001 | Kouzu et al. | ................. | 320/150 |
| 6,344,728 B1 * | 2/2002 | Kouzu et al. | ................. | 320/116 |
| 6,394,210 B2 * | 5/2002 | Matsuda et al. | ............ | 180/68.1 |
| 6,411,063 B1 * | 6/2002 | Kouzu et al. | ................. | 320/150 |
| 6,464,027 B1 * | 10/2002 | Dage et al. | ............... | 180/65.22 |
| 6,481,230 B2 * | 11/2002 | Kimishima et al. | ........... | 62/239 |
| 6,575,258 B1 * | 6/2003 | Clemmer | ................... | 180/68.5 |
| 6,651,761 B1 * | 11/2003 | Hrovat et al. | ................. | 429/13 |
| 6,803,672 B2 * | 10/2004 | Gunasekera | ................ | 307/9.1 |
| 6,899,162 B2 * | 5/2005 | Hohl et al. | .................... | 165/41 |
| 7,000,685 B2 * | 2/2006 | Morishita et al. | .......... | 165/80.4 |
| 7,025,159 B2 * | 4/2006 | Smith et al. | ................. | 180/68.1 |
| 7,096,683 B2 * | 8/2006 | Smith | ......................... | 62/200 |
| 7,143,724 B2 * | 12/2006 | Hashizumi et al. | ....... | 123/41.56 |

(Continued)

FOREIGN PATENT DOCUMENTS

| | | | |
|---|---|---|---|
| DE | 4238364 A1 * | 5/1994 | |
| EP | 1302731 A1 * | 4/2003 | |
| WO | WO 02064389 A1 * | 8/2002 | |

*Primary Examiner*—Albert Decady
*Assistant Examiner*—Dave Robertson
(74) *Attorney, Agent, or Firm*—Patent Law Office of David G. Beck

(57) ABSTRACT

A system for managing battery temperature is described. The system may include a cooling system which may include a fluid. A cabin circulation subsystem may be coupled to the cooling subsystem and may utilize the fluid for cabin cooling. A separate battery circulation subsystem may also may also be coupled to the cooling subsystem so that it may additionally utilize the fluid for battery cooling. A control may be present in order to regulate movement of the fluid to the cabin circulation subsystem and/or to the battery circulation subsystem.

18 Claims, 4 Drawing Sheets

U.S. PATENT DOCUMENTS

| | | | |
|---|---|---|---|
| 7,147,071 B2 * | 12/2006 | Gering et al. | 237/12.3 B |
| 7,172,831 B2 * | 2/2007 | Jaura et al. | 429/72 |
| 7,380,586 B2 * | 6/2008 | Gawthrop | 165/202 |
| 7,492,129 B2 * | 2/2009 | Aridome | 320/150 |
| 7,517,296 B2 * | 4/2009 | Foster et al. | 475/161 |
| 7,562,698 B2 * | 7/2009 | Fujiki et al. | 165/202 |
| 7,597,164 B2 * | 10/2009 | Severinsky et al. | 180/65.27 |
| 7,607,501 B2 * | 10/2009 | Smith et al. | 180/68.1 |
| 7,631,512 B2 * | 12/2009 | Smith | 62/228.3 |
| 7,647,788 B2 * | 1/2010 | Okuda et al. | 62/259.2 |
| 2001/0035741 A1 * | 11/2001 | Murakami et al. | 320/150 |
| 2004/0100225 A1 * | 5/2004 | Neil et al. | 320/109 |
| 2004/0257089 A1 * | 12/2004 | Aridome | 324/430 |
| 2008/0236181 A1 * | 10/2008 | Zhu et al. | 62/239 |
| 2009/0164048 A1 * | 6/2009 | Kyuma | 700/275 |
| 2009/0177345 A1 * | 7/2009 | Severinsky et al. | 701/22 |
| 2010/0019729 A1 * | 1/2010 | Kaita et al. | 320/134 |

* cited by examiner

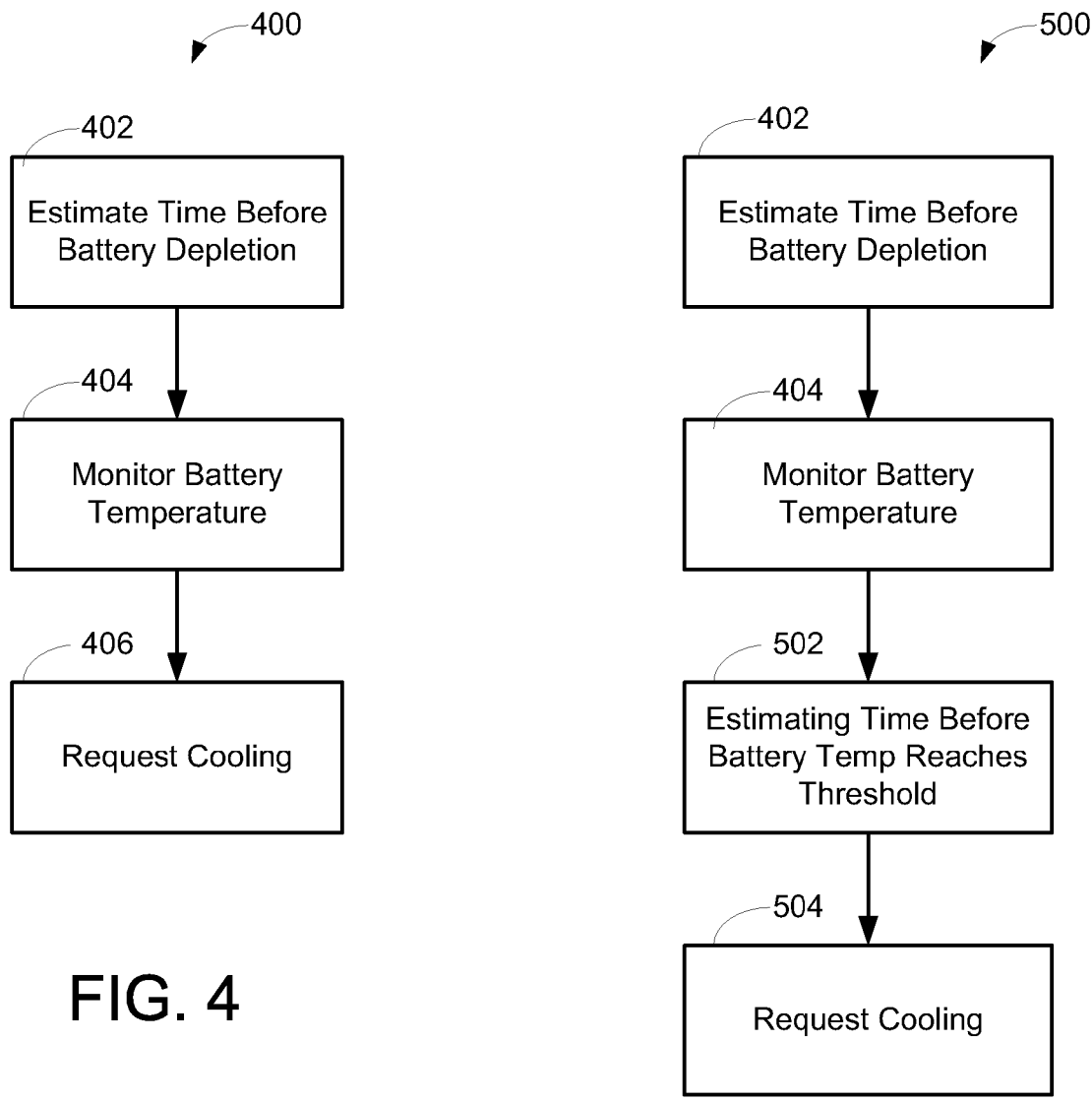

US 7,890,218 B2

CENTRALIZED MULTI-ZONE COOLING FOR INCREASED BATTERY EFFICIENCY

BACKGROUND

An extremely large percentage of the world's vehicles run on gasoline using an internal combustion engine. The use of such vehicles, more specifically the use of vehicles which rely on fossil fuels, i.e., gasoline, creates two problems. First, due to the finite size and limited regional availability of such fuels, major price fluctuations and a generally upward pricing trend in the cost of gasoline are common, both of which can have a dramatic impact at the consumer level. Second, fossil fuel combustion is one of the primary sources of carbon dioxide, a greenhouse gas, and thus one of the leading contributors to global warming. Accordingly, considerable effort has been spent on finding alternative drive systems for use in both personal and commercial vehicles. Electric vehicles offer one of the most promising alternatives to vehicles that use internal combustion drive trains.

One of the principal issues involved in designing an efficient electric drive train and energy storage system is thermal management, primarily due to the required operating conditions of the battery cells and the ability to provide on-demand heating and cooling within the passenger cabin. To date, some electric vehicle thermal management systems have had limited capabilities, been overly complex, or both. For example, early generation electric vehicles often used multiple independent heat management subsystems. Such an approach required the use of numerous components (e.g., pumps, valves, refrigerant systems, etc.), and complex interacting controls.

BRIEF DESCRIPTION OF THE DRAWINGS

Embodiments of inventive subject matter may be best understood by referring to the following description and accompanying drawings, which illustrate such embodiments. In the drawings:

FIG. 4 is a flow diagram illustrating a method for cooling a battery according to various embodiments;

FIG. 5 is a flow diagram illustrating another method for cooling a battery according to various embodiments;

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
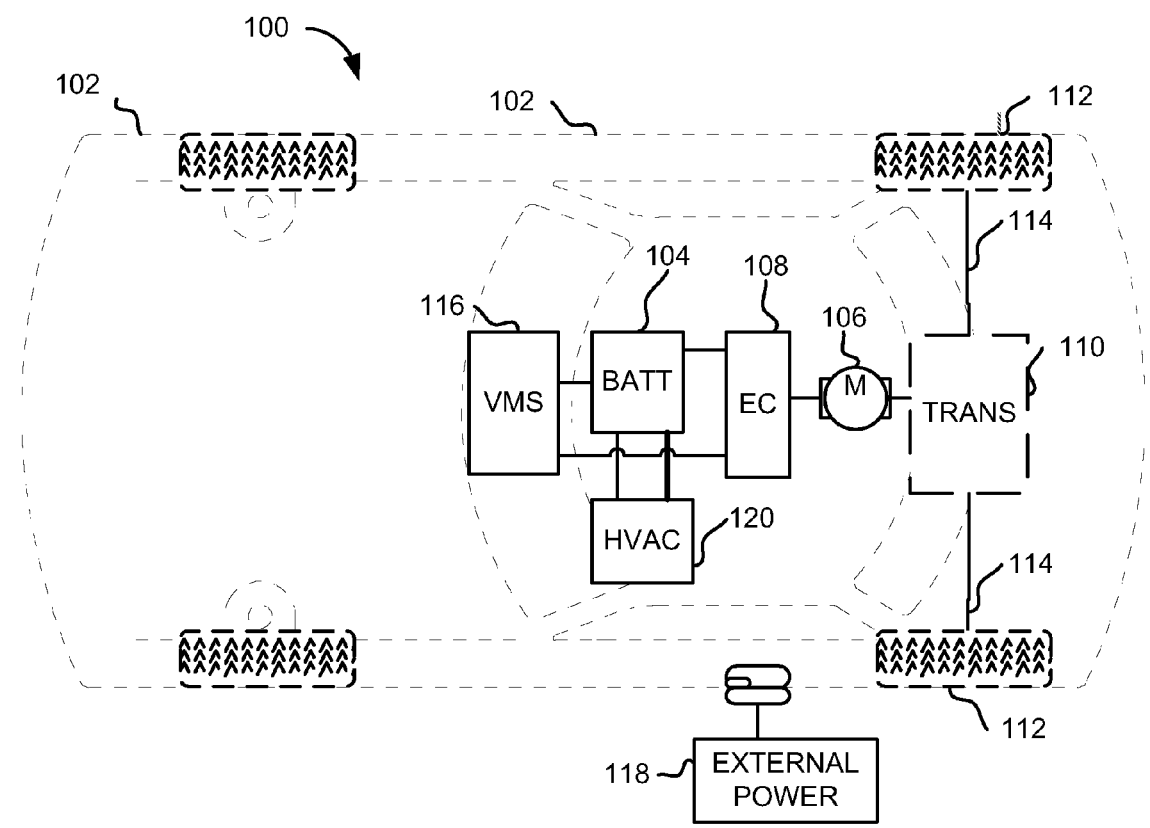
FIG. 1 shows a vehicle system according to one embodiment of the present subject matter.

FIG. 1 shows an electric vehicle system 100 according to one embodiment of the present subject matter. In various embodiments, the vehicle 102 is an electric vehicle and includes a vehicle propulsion battery 104 and at least one propulsion motor 106 for converting battery energy into mechanical motion, such as rotary motion. The present subject matter includes examples in which the vehicle propulsion battery 104 is a subcomponent of an energy storage system ("ESS"). An ESS includes various components associated with transmitting energy to and from the vehicle propulsion battery in various examples, including safety components, cooling components, heating components, rectifiers, etc. The inventors have contemplated several examples of ESS, and the present subject matter should not be construed to be limited to the configurations disclosed herein, as other configurations of a vehicle propulsion battery and ancillary components are possible.

The vehicle propulsion battery 104 includes a lithium ion battery in various examples. In some examples, the vehicle propulsion battery 104 includes a plurality of lithium ion batteries coupled in parallel and/or series. Some examples include cylindrical lithium ion batteries. In some examples, the ESS includes one or more batteries compatible with the 18650 battery standard, but the present subject matter is not so limited. Some examples include approximately 2981 batteries which are interconnected. The vehicle propulsion battery 104, in some examples, provides approximately 390 volts.

Additionally illustrated is an energy converter 108. The energy converter 108 is part of a system which converts energy from the vehicle propulsion battery 104 into energy useable by the at least one propulsion motor 106. In some instances, the energy flow is from at least one propulsion motor 106 to the vehicle propulsion battery 104. As such, in some examples, the vehicle propulsion battery 104 transmits energy to the energy converter 108, which converts the energy into energy usable by the at least one propulsion motor 106 to propel the electric vehicle. In additional examples, at least one propulsion motor 106 generates energy that is transmitted to the energy converter 108. In these examples, the energy converter 108 converts the energy into energy which can be stored in the vehicle propulsion battery 104. In some examples, the energy converter 108 includes transistors. Some examples include one or more field effect transistors. Some examples include metal oxide semiconductor field effect transistors. Some examples include one or more insulated gate bipolar transistors. As such, in various examples, the energy converter 108 includes a switch bank which is configured to receive a direct current ("DC") power signal from the vehicle propulsion battery 104 and to output a three-phase alternating current ("AC") signal to power the vehicle propulsion motor 106. In some examples, the energy converter 108 is configured to convert a three phase signal from the vehicle propulsion motor 106 to DC power to be stored in the vehicle propulsion battery 104. Some examples of the energy converter 108 convert energy from the vehicle propulsion battery 104 into energy usable by electrical loads other than the vehicle propulsion motor 106. Some of these examples switch energy from approximately 390 Volts to approximately 14 Volts.

The propulsion motor 106 is a three phase AC propulsion motor, in various examples. Some examples include a plurality of such motors. The present subject matter can optionally include a transmission 110 in some examples. While some examples include a 2-speed transmission, other examples are contemplated. Manually clutched transmissions are contemplated, as are those with hydraulic, electric, or electrohydraulic clutch actuation. Some examples employ a dual-clutch system that, during shifting, phases from one clutch coupled to a first gear to another clutch coupled to a second gear. Rotary motion is transmitted from the transmission 110 to wheels 112 via one or more axles 114, in various examples.

A vehicle management system 116 is optionally provided which provides control for one or more of the vehicle propulsion battery 104 and the energy converter 108. In some examples, the vehicle management system 116 may be coupled to vehicle systems which monitors safety (such as a crash sensor). In some examples the vehicle management system 116 may be coupled to one or more driver inputs (such as a speed adjuster or accelerator, colloquially termed a throttle, although the present subject matter is not limited to examples having an actual throttle). The vehicle management system 116 may be configured to control power to one or more of the vehicle propulsion battery 104 and the energy converter 108, in various embodiments. According to other embodiments, the VMS may serve as a liaison between the ESS and the cooling system but may not interact with the throttle pedal, gear selector, or other functions.

A charging station 118 may be provided to transmit energy with the vehicle propulsion battery 104, in various examples. In some examples, the charging station converts power from a 110V AC power source into power storable by the vehicle propulsion battery 104. In additional examples, the charging station converts power from a 220V AC power source into power storable by the vehicle propulsion battery 104. The present subject matter is not limited to examples in which a converter for converting energy from an external source to energy usable by the vehicle 102 is located outside the vehicle 102, and other examples are contemplated.

A heating, ventilation and air conditioning ("HVAC") system 120 may be provided to perform various heating and cooling functions within the electric vehicle 102. The HVAC system 120 may provide cooled or heated air to the cabin environment for the comfort of the passengers in some embodiments. Additionally, the HVAC system may provide heating and cooling for various mechanical and electrical components of the vehicle 102. The HVAC system 120 need not have both heating and cooling capabilities. Heating and cooling may optionally be produced separately, using one or more additional components. According to some embodiments, the HVAC system 120 may provide cooling to the battery 104. In some examples, the life and operational efficiency of the battery 104 may be affected by temperature. In order to maintain the battery in a good operating condition, cooling from the HVAC system 120 may be provided to the battery 104 in calculated amounts. The HVAC 120 may itself be powered off of voltage from the battery 104. This voltage may be converted to a suitable voltage by the energy converter 108 before it is used by the HVAC system 120 in accordance with some embodiments. Further operations of the HVAC system, 120, specifically with regard to battery cooling may be described below.

Figure 2:
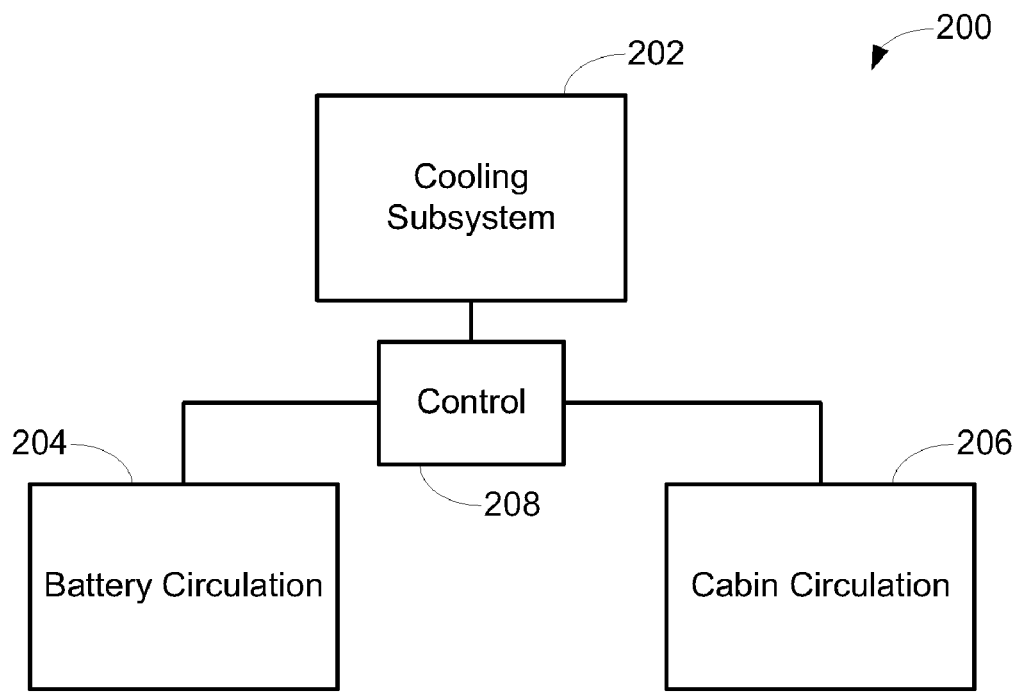
FIG. 2 is a block diagram of a system for cooling a battery and cabin according to various embodiments.

FIG. 2 is a block diagram of a system 200 for cooling a battery and cabin according to various embodiments. The system 200 includes a cooling subsystem 202, a battery circulation subsystem 204, a cabin circulation subsystem 206, and a control 208.

The cooling subsystem 202 may include one or more components which are operable to create a reduction in temperature. The reduction in temperature may be brought on in a number of ways, including compressing a refrigerant according to one embodiment. The refrigerant may be tetrafluoroethane or R134a, as commonly used in vehicles, or another refrigerant. Additionally, the cooling subsystem 202 may operate using a thermal electric technique that may use a solid state "Peltier" device such that the cooling subsystem 202 would not necessitate the use of a refrigerant. These and other cooling methods may be used by the cooling subsystem 202, although the inventive subject matter is not limited to any particular method of cooling within the cooling subsystem 202.

The battery circulation subsystem 204 may include one or more components which are operable to transfer cooling and reduce the heat in a battery. Fluid from the cooling subsystem 202 may be routed to the battery circulation subsystem 204 to reduce the heat in the battery. If the fluid is a refrigerant, an expansion valve, evaporator and/or a heat exchanger may be used as part of the battery circulation subsystem 204. According to various embodiments, the heat exchanger may cool a coolant which may be routed in thermal contact with the battery. Additionally, according to other embodiments, a fan may blow air over the evaporator and route the cooled air across the battery. Other methods for removing heat from the battery may be used as well.

The cabin circulation subsystem 206 may be used to provide cooling to the cabin of a vehicle according to various embodiments. In some embodiments, the cabin circulation subsystem may include fans, ducting, and venting as traditionally found in automobiles, although the inventive subject matter is not limited in this respect. If the cooling subsystem 202 provides a compressed refrigerant, the cabin circulation subsystem 206 may include an expansion valve and evaporator for the refrigerant. Fans may blow air over the evaporator to provide cooled air to the cabin. Other methods for cooling the cabin using the cabin circulation subsystem may be used according to other embodiments.

A control 208 may be present to regulate the movement of fluid or other cooling medium between the cooling subsystem 204 and at least one of the battery circulation subsystem and the cabin circulation subsystem 206. The control 208 may operate automatically based on programming implemented by a processor, it may be manually controlled, or may be a combination thereof.

Figure 3:
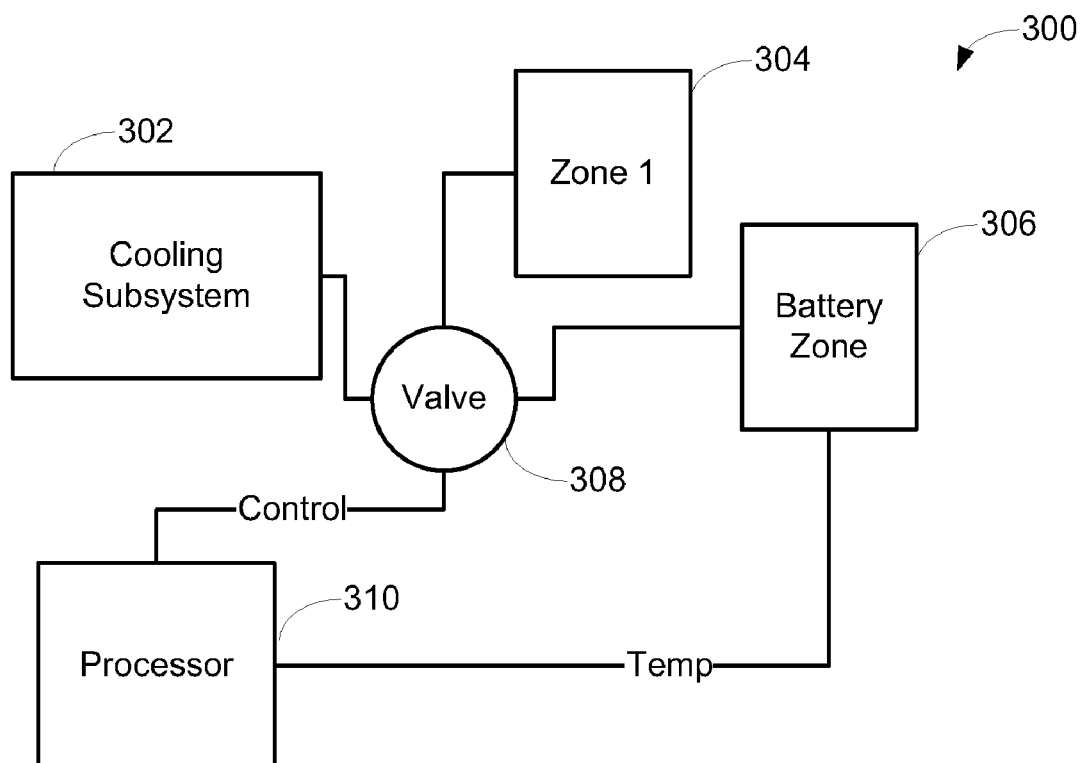
FIG. 3 is a block diagram of a system for cooling multiple zones according to various embodiments.

FIG. 3 is a block diagram of a system 300 for cooling multiple zones according to various embodiments. The system 300 includes a cooling subsystem 302, a first zone 304, a battery zone 306, a valve 308, and a processor 310.

The cooling subsystem 302 may be similar to the cooling subsystem 202 described above with reference to FIG. 2. The cooling subsystem 302 may utilize one or more cooling techniques using various technologies to provide cooling to the first zone 304 and/or to the battery zone through the valve 308. Other zones may additionally be in communication with, or coupled to, the cooling subsystem through the valve 308 or other additional valves.

The first zone 304, or any additional zones may include the cabin of a vehicle, a motor, an engine, an additional battery, or other component or space which may use cooling. The battery zone 306 includes a battery which may provide increased efficiency when cooled effectively. The first zone 304 and the battery zone 306 may be in communication with the cooling subsystem through the valve 308. According to various embodiments, the valve 308 may regulate the fluid communication between the cooling subsystem and the first zone 304 and the battery zone 306. Additionally, according to some embodiments, the valve 308 may consist of multiple valves individually regulating cooling to one or more zones.

The processor 310 may monitor the temperature of the battery zone 306 in order to determine whether or not the battery is above certain thresholds. Temperature thresholds may be defined to trigger when the battery needs cooling, when the battery is heated above safe operational temperature and other thresholds. When the processor determines that the battery zone 306 is to be cooled, it signals the valve 308 to allow communication between the cooling subsystem 302 and the battery zone 306, thus reducing heat rise in the battery zone 306. The processor may act in accordance with one or more algorithms to attempt to maintain the battery within ideal operation temperatures, while also taking into consideration prioritization of cooling between zones and energy efficient operation of the cooling subsystem 302. Examples of these algorithms are described with reference to FIG. 4 and FIG. 5 below.

FIG. 4 is a flow diagram illustrating a method 400 for cooling a battery according to various embodiments. The method 400 begins by estimating the remaining operational time that the battery may run before it is effectively depleted (block 402). The battery is effectively depleted, or has reached depletion when it can no longer supply the power necessary to perform a minimum amount of functionality. Depletion does not necessitate that the battery have no charge remaining, or that it registers zero (0) voltage between its terminals. According to an example embodiment, a battery may be considered depleted if the voltage between its terminals is measured at below 350 volts resting, when its nominal operating voltage is around 390 volts. Under load, however, the voltage may be allowed to drop below 350 volts without being considered depleted. In some embodiments, the voltage may drop below 250 volts under load before being considered depleted. Estimating the remaining operational time of the battery before depletion may entail measuring and calculating the average draw of power on the battery. In an electric vehicle, the power train provides one of the biggest draws on the battery, thus the activity of the power train may largely affect the estimate. Other factors such as operation of the cooling system and other electrical components may play into the estimate as well. Sporadic driving or use of electrical systems may influence the accuracy of the estimate.

During operation the temperature of the battery may be monitored, and if it is below a threshold, it may be allowed to rise without any application of cooling (block 404). Temperature monitoring may be continuous or periodic, and the data measured may be used to determine the current temperature of the battery as well as the rate of change in its temperature.

Cooling may be strategically requested to be applied to the battery in order to increase efficiency as well as maintain the battery in a safe operating temperature range. Generally in an electric vehicle, the components used for providing cooling are electrically powered. In an example embodiment, an electrically driven compressor may be used to pressurize a refrigerant. In other embodiments, thermal electric components using solid state "Peltier" device may be employed to reduce heat. In any case, the system used to reduce the heat in the battery may require power from the battery. An algorithm may be used to efficiently cool the battery. Using the estimate of operational time remaining on the battery before it is depleted, cooling may be requested in an amount which is enough to assure that the battery stays below a peak threshold until it is depleted (block 406). The peak threshold may represent the upper temperature limit that is within the safe operating range for the battery. This may represent a limit at which the lifetime of the battery is negatively affected with higher temperatures.

The method 400 allows the battery to only be cooled as much as is needed given the estimated time remaining that it will be used. Additionally, just as the temperature of the battery is being monitored continuously or periodically, the voltage level and power draw on the battery may also be monitored. With changing characteristics (including battery voltage, power draw, temperature, driving conditions and more . . . ), the estimate of operational time before the battery is depleted (block 402) may change, according to some embodiments. This changing estimate may affect the timing of any requests for cooling of the battery (block 406). The amount of cooling to the battery may be variable based on the current battery temperature. The device providing the cooling may have variable levels of operation, and lower levels (drawing less power) may be used when less cooling is needed. In one example, if another zone such as the cabin is being cooled, varying levels of cooling may be routed to the battery at the expense of the cooling of the other zone. In some cases, according to various embodiments, cooling in the cabin may be sacrificed in order to cool the battery. The remaining time before depletion may also affect the amount of cooling to be delivered to the battery. In some cases, cooling of the battery may be avoided if the circumstances permit.

FIG. 5 is a flow diagram illustrating another method for cooling a battery according to various embodiments. The method 500 begins in a similar fashion as the method described with reference to FIG. 4. In addition to estimating the remaining operational time that the battery may run before it is effectively depleted (block 402) and monitoring the battery temperature (block 404), an additional estimation may be made. Based on the rate of rise of the battery temperature the time before the battery reaches a temperature threshold may be estimated (block 502). This temperature threshold may be the peak temperature threshold described above.

The estimated time before the battery reaches the threshold may be compared with the estimated operational time remaining before the battery is depleted. Cooling may be requested for the battery if the time before the battery temperature reaches the threshold is less than the remaining operational time before depletion of the battery (block 504). If the time before the battery reaches the threshold is longer than the remaining operational time before the battery reaches depletion, cooling may not be requested, and battery power may be conserved.

Figure 6:
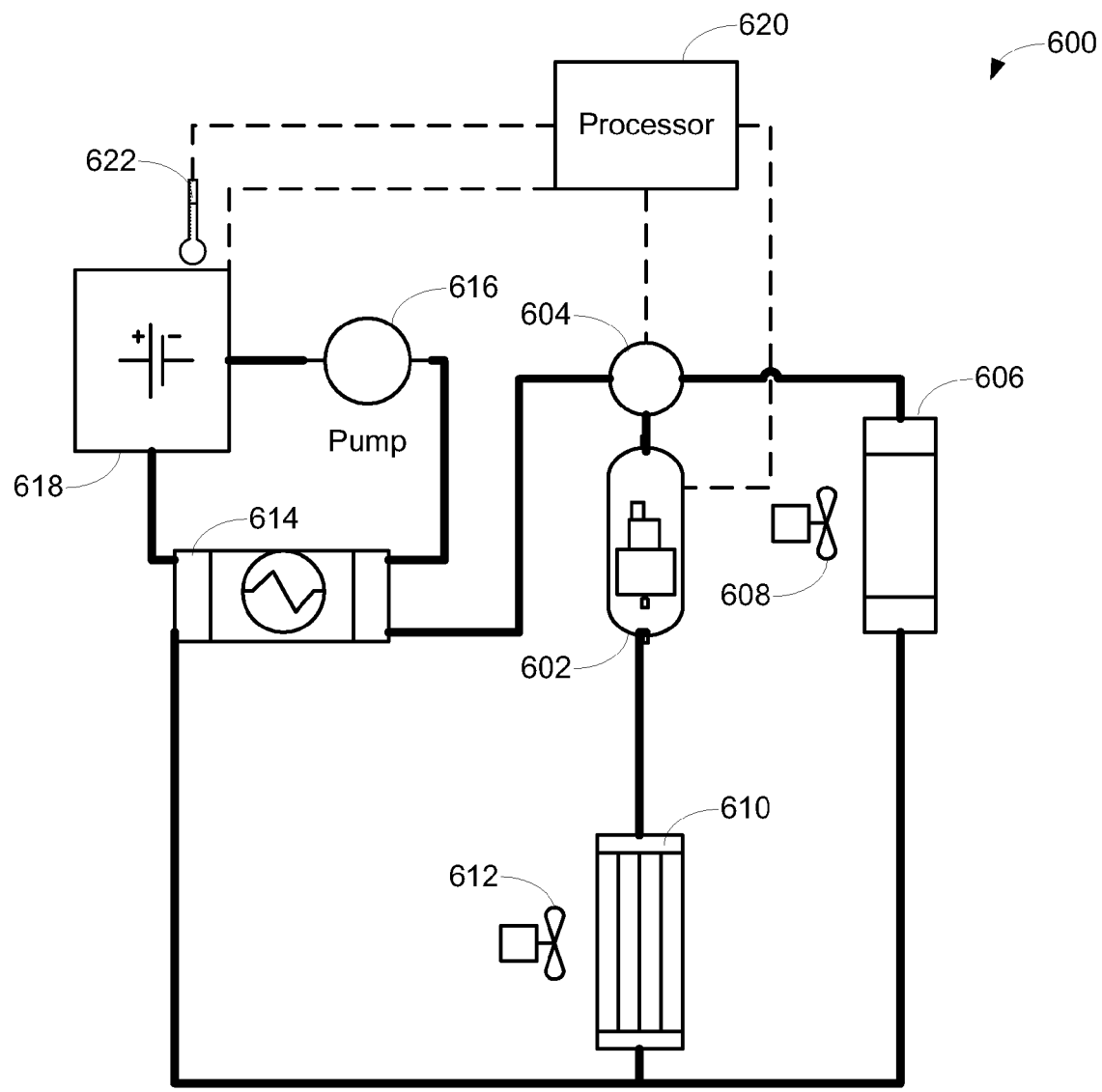
FIG. 6 is a block diagram of an example system according to some embodiments.

FIG. 6 is a block diagram of an example system 600 according to some embodiments. The system 600 includes a compressor 602, a valve 604, an evaporator 606, an evaporator fan 608, a condenser 610, a condenser fan 612, a heat exchanger 614, a coolant pump 616, a battery 618, a processor 620 and a temperature sensor 622.

In the example embodiment illustrated by FIG. 6, the compressor 602 may compress a refrigerant. The refrigerant may be selected out of a number of potential compressible fluids, and may be, for example, R134a as mentioned earlier, although the inventive subject matter is not limited in this respect. The use of a particular refrigerant or any refrigerant at all is not a limiting factor. The compressed refrigerant may be directed through the valve 604. The valve 604 may direct the refrigerant to an expansion valve and evaporator 606 assembly. Upon decompression in the evaporator 606, refrigerant pulls heat from the evaporator 606, cooling the evaporator 606. The evaporator fan 608 may blow air over the evaporator 606 to cool the cabin of a vehicle. The refrigerant may then be routed through the condenser 610 where it may be cooled with the help from the condenser fan 612. The refrigerant may then make its way back to the compressor 602 to begin the cycle again.

As the compressed refrigerant reaches the valve 604, it may be directed to the heat exchanger 614. The heat exchanger 614 may include an expansion valve allowing the refrigerant to expand. Since the expansion of the refrigerant is endothermic, it will pull heat from its surroundings. Also routed through the heat exchanger 614 is a coolant fluid. The coolant fluid may be cooled by the expanding refrigerant in the heat exchanger 614. The refrigerant may again return through the condenser 610. The cooled coolant fluid may be moved through the pump 616 into thermal contact with the battery 618. The battery 618 may include a number of cells, and the coolant may be routed through the inside of the battery casing to provide more direct thermal contact with individual battery cells. The pump 616 may circulate the coolant fluid through the battery 618 and the heat exchanger 614 to maintain cooling of the battery 618.

The processor 620 may regulate the operation of the compressor 602, the valve 604 and optionally the pump 616. The processor 620 may utilize algorithms, examples of which are discussed above with reference to FIG. 4 and FIG. 5. Data needed to execute the algorithms may be obtained by gathering temperature measurements from the battery 618. A temperature sensor 622 may provide the temperature measurements to the processor 620. The temperature sensor 622 may include one or more thermistors, thermocouples, or any other temperature measuring device. The temperature may be determined on a cell-by-cell basis or for the battery as a whole. The processor 620 may also measure the voltage across the battery 618 and/or the current. Multiple, continuous, or periodic measurements may be used to help estimate averages or trends in the power draw and battery temperature.

With collected data, the processor 620 may estimate the remaining operational time that the battery may run before it is effectively depleted, and the time before the battery reaches a temperature threshold. The collected data may include vehicle speed, transmission gearing, DC current or AC phase current, or other data used to assess power consumption and estimate heat generation based on assumptions about the driver and the drive. With these estimates, the processor 620 may regulate the compressor 602 and the valve 604 in order to provide necessary cooling for the battery while maintaining efficient use of power.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A system for managing a battery within a vehicle, comprising:
   a cooling subsystem including a fluid;
   a cabin circulation subsystem coupled to the cooling subsystem to utilize the fluid for cabin cooling;
   a battery circulation subsystem coupled to the cooling subsystem to utilize the fluid for battery cooling;
   a temperature sensor that monitors a battery temperature corresponding to the battery; and
   a processor to regulate operation of the cabin circulation subsystem and the battery circulation subsystem, wherein said processor estimates a remaining operational time before the battery reaches a state of depletion, wherein said processor estimates a time before said battery temperature reaches a threshold battery temperature, and wherein said processor prevents operation of said battery circulation subsystem if said remaining operational time is less than said time before said battery temperature reaches said threshold battery temperature.

2. The system of claim 1, wherein the processor operates said battery circulation subsystem to prevent said battery temperature from exceeding a peak threshold battery temperature if said remaining operational time is greater than said time before said battery temperature reaches said threshold battery temperature.

3. The system of claim 1, wherein the processor operates the battery circulation subsystem to assure the battery is maintained below a threshold temperature during said remaining operational time, wherein the processor only operates the battery circulation subsystem if said remaining operational time is greater than said time before said battery temperature reaches said threshold battery temperature.

4. The system of claim 1, wherein the cooling subsystem further includes a compressor to pressurize the fluid.

5. The system of claim 4, wherein the processor is further operable to regulate the operation of the compressor.

6. The system of claim 1, wherein the battery circulation subsystem includes a further fluid in thermal contact with the battery, and wherein the further fluid receives cooling from the fluid of the cooling subsystem.

7. The system of claim 1, further comprising
   a valve to regulate flow of said fluid, the valve controlled by the processor.

8. The system of claim 1, further comprising an evaporator in communication with the cooling subsystem to provide cooling to said cabin circulation subsystem.

9. The system of claim 1, further comprising an accessory valve controlled by the processor to cool an additional zone.

10. The system of claim 9, wherein the processor is operable to restrict said accessory valve to decrease cooling in said additional zone and increase cooling in the battery circulation subsystem.

11. The system of claim 1, wherein the cooling subsystem is powered by the battery.

12. A method for cooling a battery in a vehicle, comprising:
    monitoring a battery temperature corresponding to the battery;
    estimating a time before said battery temperature reaches a threshold battery temperature;
    estimating a remaining operational time before the battery reaches a state of depletion;
    comparing said remaining operational time with said time before said battery temperature reaches said threshold battery temperature; and
    preventing cooling for the battery if said remaining operational time is less than said time before said battery temperature reaches said threshold battery temperature.

13. The method of claim 12, further comprising the step of cooling the battery if said remaining operational time is greater than said time before said battery temperature reaches said threshold battery temperature, wherein said cooling step is performed to prevent said battery temperature from exceeding a peak threshold battery temperature.

14. The method of claim 13, wherein the amount of cooling is based on the battery temperature.

15. The method of claim 13, wherein the amount of cooling is based on the remaining operational time.

16. The method of claim 12, further comprising the step of cooling the battery if said remaining operational time is greater than said time before said battery temperature reaches said threshold battery temperature, wherein said cooling step is performed to prevent said battery temperature from exceeding said threshold battery temperature.

17. The method of claim 16, further comprising the step of decreasing cooling in a first cooling zone separate from a second cooling zone in order to provide cooling to the battery, wherein said second cooling zone includes said battery.

18. The method of claim 17, wherein the first cooling zone includes a cabin in the vehicle.

* * * * *